United States Patent [19]
Greig

[11] Patent Number: 5,824,179
[45] Date of Patent: Oct. 20, 1998

[54] METHOD OF JOINING REINFORCED THERMOPLASTIC PIPES

[75] Inventor: John Martyn Greig, Whitley Bay, Great Britain

[73] Assignee: British Gas plc, London, England

[21] Appl. No.: 582,991

[22] PCT Filed: Jul. 19, 1994

[86] PCT No.: PCT/GB94/01566

§ 371 Date: Mar. 12, 1996

§ 102(e) Date: Mar. 12, 1996

[87] PCT Pub. No.: WO95/03162

PCT Pub. Date: Feb. 2, 1995

[30] Foreign Application Priority Data

Jul. 20, 1993 [GB] United Kingdom .................... 9314971

[51] Int. Cl.[6] .................... B32B 31/20; F16L 47/02
[52] U.S. Cl. .................... 156/274.2; 156/294; 156/304.2; 156/304.6; 285/21.2; 219/535
[58] Field of Search ................ 156/304.2, 274.2, 156/294, 158, 499, 503, 86, 304.6, 309.9, 309.6; 285/21.1, 21.2; 219/535

[56] References Cited

U.S. PATENT DOCUMENTS

| 3,919,034 | 11/1975 | Carini . | |
|---|---|---|---|
| 4,357,962 | 11/1982 | Shaw et al. | 138/125 |
| 4,492,063 | 1/1985 | Schock et al. . | |
| 4,530,521 | 7/1985 | Nyffeler et al. | 285/21.2 |
| 5,328,541 | 7/1994 | Usui et al. | 156/304.2 |

FOREIGN PATENT DOCUMENTS

| 0 063 234 | 10/1982 | European Pat. Off. . |
| 0 075 901 | 4/1983 | European Pat. Off. . |
| 0 359 330 | 3/1990 | European Pat. Off. . |
| 0 535 247 | 4/1993 | European Pat. Off. . |
| 35 41 318 | 7/1987 | Germany . |
| 2060730 | 1/1990 | Japan . |
| 5272690 | 10/1993 | Japan . |
| 2 077 880 | 12/1981 | United Kingdom . |

OTHER PUBLICATIONS

Patent Abstracts of Japan, No. JP2060730, Jan. 03, 1990.
Patent Abstracts of Japan, No. 5–272690, Oct. 19, 1993, vol. 18, No. 51 p. 74.
Patent Abstracts of Japan, vol. 18, No. 51, p. 74, JP–272690.

*Primary Examiner*—Michael W. Ball
*Assistant Examiner*—Michael A. Tolin
*Attorney, Agent, or Firm*—Larson & Taylor

[57] ABSTRACT

An electrofusion coupler is slid over one of two thermoplastic pipes, each having a layer or layers of reinforcing fibers between the center of the wall of the pipe and the outside surface of the pipe. The end surfaces are trimmed in a butt fusion machine and the resulting end surfaces are forced against a heater plate. The plate is removed and the end surfaces are forced together. Internal and external beads involving inward and outward flow of material result, the outward flow ensures that there is at the welded joint an inner layer which is free from reinforcement fibers. The external bead is removed and the coupler is slid over the butt fused welded joint and energized to cause it to become fusion welded to the outside of the pipe.

7 Claims, 3 Drawing Sheets

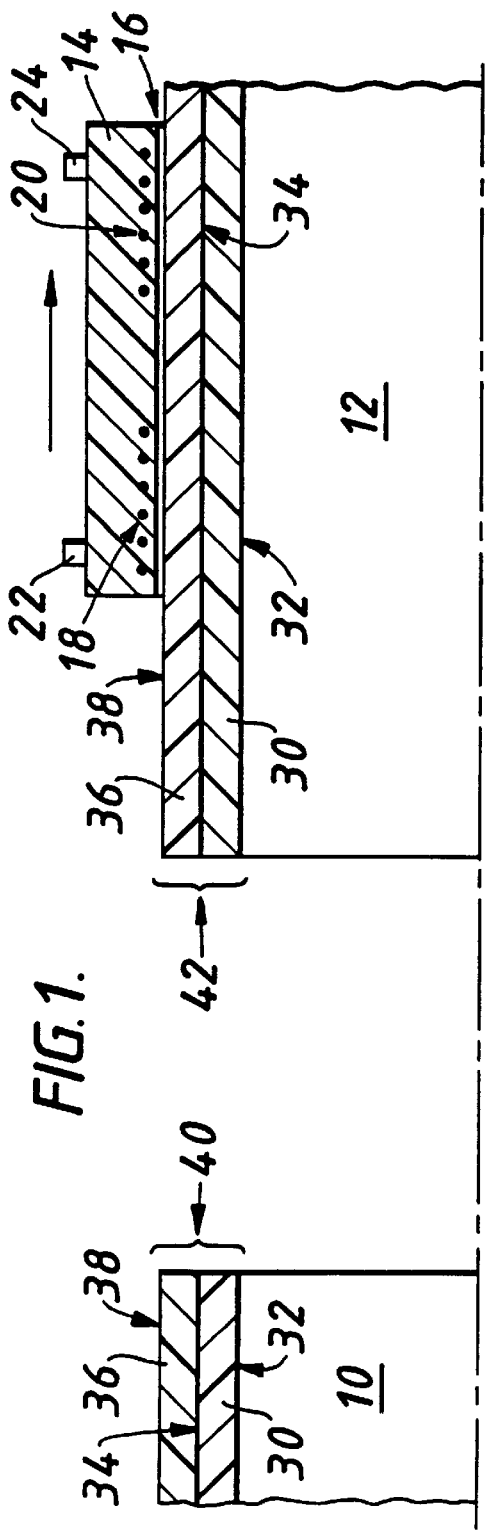
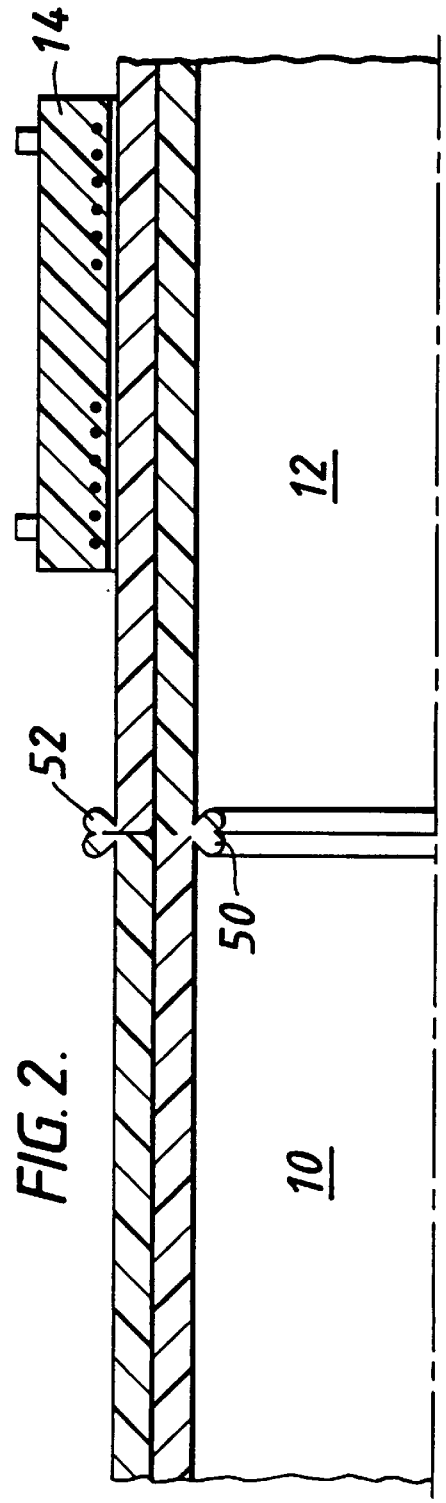
FIG. 1.
FIG. 2.

METHOD OF JOINING REINFORCED THERMOPLASTIC PIPES

The invention relates to methods of joining reinforced thermoplastic pipes.

The invention particularly, though not exclusively, relates to joining of pipes which have their pressure rating enhanced by each having a layer or layers of fibre reinforcement. The fibres, for example, can be wound directly over an inner pipe of thermoplastic material or can be preformed into tapes before winding. In another example, the fibres or tapes extend purely longitudinally down the inner pipe. An external layer of thermoplastic material, not necessarily of the same type or grade as the inner pipe, is added over the reinforcement to completely cover the latter for protection. The fibres or tapes may be fused to each other and to the inner pipe and the external layer or, if preferred, the fibres or tapes may be loose. The inner pipe together, with the surrounding layer or layers of reinforcement and with the added external layer, forms a pipe having a pipe wall between the inside surface of the inner pipe and the outside surface of the external layer and the layer or each of the layers of reinforcement lies at the centre of the pipe wall or lies between the centre and the outside surface of the external layer.

It is known to join thermoplastic reinforced pipes using a mechanical fitting which is clamped onto the pipe, for example, or which compresses the thermoplastic material between an inner metal supporting tube and external metal collar. Such fittings are designed to create a fluid seal and to have substantial resistance to "pull out" of the pipe from the fitting.

Such fittings, which are largely of metal, are subject to corrosion. Moreover, the internal fluid may affect the properties of the thermoplastic so that it softens, with the result that the clamping forces, and hence the seal and "pull out" characteristics, are lost over a period of time.

It is the aim of the invention to avoid the use of such fittings.

According to the invention, a method of joining two reinforced thermoplastic pipes by a butt fused welded joint is provided, each pipe having an inside and an outside surface and a pipe wall extending between the inside and the outside surface and one or more layers of reinforcement fibres lying within the outer half of the pipe wall, the end portions of the pipes being heated by being forced against a heater plate interposed between them so that thermoplastic material from the end portions of the pipes becomes molten and then following removal of the heater plate the end surfaces are forced together and molten material from the end portions is upset involving inward and outward flow of thermoplastic material to form internal and external beads, after which the pipes are allowed to cool while being constrained against axial separating movement, and the or each reinforcement layer is wholly or primarily displaced outwardly by said outward flow during upsetting from its original position so that, at the welded joint, there is a layer of thermoplastic material between the layer or layers of reinforcement fibres and the common inside surface which layer is free from reinforcement fibres.

Embodiments of the invention will now be described by way of example with reference to the accompanying drawings, in which:

FIGS. 1 to 4 show various stages of joining two thermoplastic pipes together;

Figure 3:
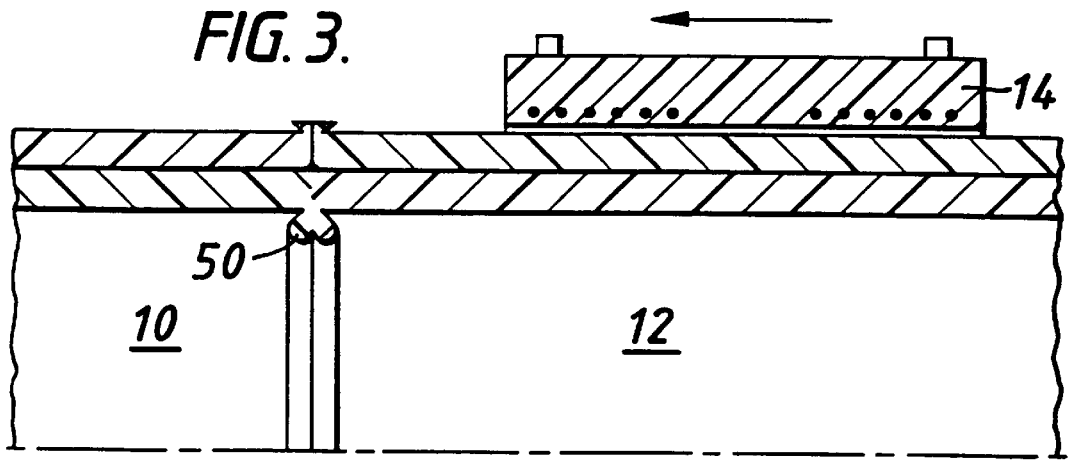

FIG. 1 shows two pipes 10, 12 which are to be joined by a butt fused welded joint. One pipe 12 has an electrofusion coupler 14 encircling the pipe 12. The coupler 14 is a loose fit upon the pipe 12, a diametral clearance 16 being shown. The coupler 14 carries a heating element which is embedded in the thermoplastic wall of the coupler and comprising two groups 18, 20 of windings surrounding the pipe 12. The heating coil is connected to terminals (not shown) within shrouds 22, 24 integral with the coupler 14.

Each pipe 10, 12 comprises an inner pipe 30 of thermoplastic material having an inside surface 32; a layer or layers of reinforcement fibres 34 wound around the inner pipe 30 or extending merely longitudinally down the pipe 30; and an external layer of thermoplastic material 36, which has been added to the inner pipe 30 following application of the layer or layers 34. The external layer 36 has an outside surface 38.

Each pipe 10, 12 thus has a pipe wall between the inside surface 32 and the outside surface 38.

Before joining the end surfaces of the pipes 10, 12 they are accurately trimmed so that clean surfaces 40, 42 of the pipes are produced. This operation is performed while the pipes 10, 12 are held in a butt fusion machine (not shown). The pipes 10, 12 are then forced by hydraulic cylinders against a heater plate (not shown) which is interposed between the pipe ends 40, 42. Initial beads are formed on each pipe as the thermoplastic material becomes molten and is upset by the applied axial load.

The pipes 10, 12 are held against the heater plate for a heat soak period. Next, the pipes 10, 12 are retracted from the plate, the plate is removed and the pipes 10, 12 are brought together under an axial load. Molten material from the end portions of the pipes 10, 12 is upset, involving inward and outward flow of thermoplastic material to form final internal and external beads 50, 52.

The pipes 10, 12 are allowed to cool, the axial force being removed during the final stage of cooling although the pipes 10, 12 are constrained against axial separating movement (FIG. 2).

Figure 5:
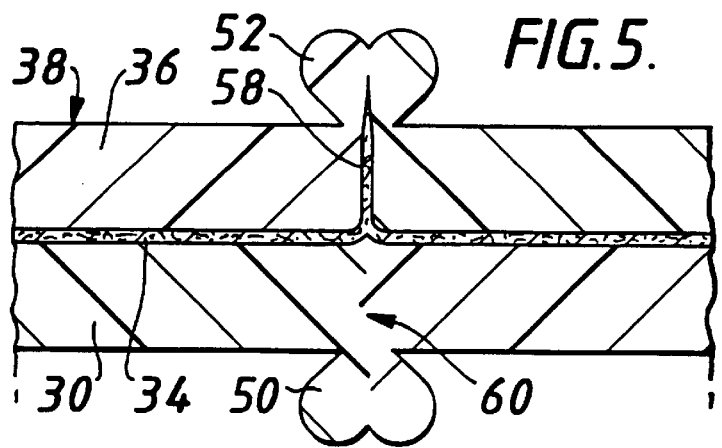
FIG. 5 shows on a larger scale the zone of the joint shown in FIG. 2.

The or each reinforcement layer 34 of each pipe 10, 12 is wholly or primarily displaced outwardly at 58 by the outward flow of thermoplastic material from its original position (FIG. 5). The result is that, at the welded joint, there is a layer 60 of thermoplastic material adjoining the common inside surface 32 which is free from reinforcement fibres.

Next, the external bead 52 is removed (FIG. 3) and the electrofusion coupler 14 is centralised over the butt fused welded joint by sliding it along the pipe 12 until it half covers the pipe 10 and half covers the pipe 12.

Figure 4:
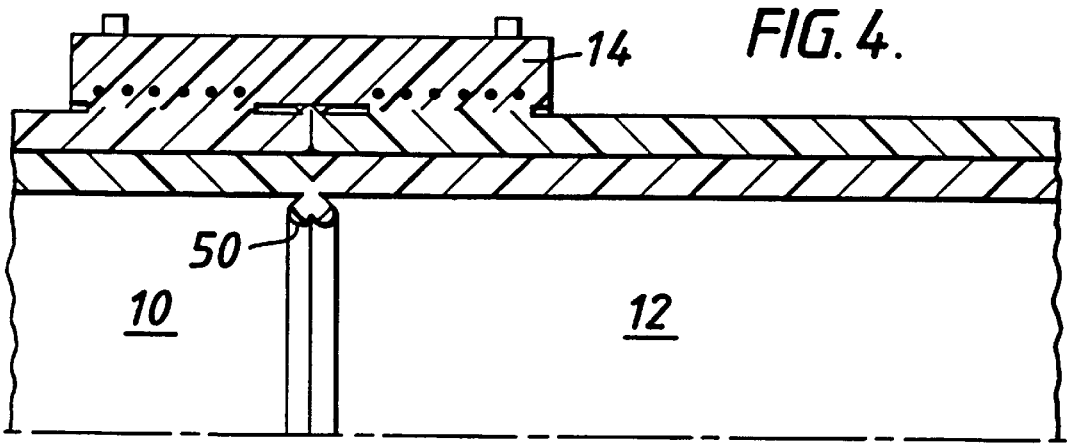

Finally, the terminals are connected to a source of electrical energy and current is passed through the heating element for a sufficient time for the coupler 14 to become welded by electrofusion to the end portions of the pipes 10, 12 (FIG. 4). A small central zone, between the group 18 of windings and the group 20 of windings, is not fused and contains the stub of the external bead 52.

By way of example, joints have been made between pipes of polyethylene reinforced with aramid fibres. The pipes were 125 millimeters in outside diameter and had a wall thickness of 11.5 millimeters. The quotient found by dividing the outside diameter by the wall thickness, which is known as the Standard Dimension Ratio (SDR), was 11. The internal and external beads were 11 millimeters wide (ie measured parallel to the length of the pipe) and 5 millimeters high (ie measured radially with respect to the pipe). In other examples, the internal and external beads were very small, being 3 millimeters wide and 2 millimeters high.

In these examples, the inner pipe 30 and the external layer 36 were of the same grade of polyethylene. However, in general, the inner pipe 30 and the external layer 36 can be composed of the same or different grades of the same thermoplastic material or be composed of the same or different thermoplastic materials.

The larger beads are preferred where it is necessary to perform quality control checks on the performance and consistency of the butt weld, the bead being readily removed for inspection. On the other hand, very small beads are advantageous because the internal bead does not impede the flow of product as much as the larger bead. Also, it would not be necessary to remove the external bead in order to allow the electrofusion coupler to slide over the butt fused joint, the clearance between the coupler and the pipe being large enough to accommodate the external bead. In practice any size of bead could be produced depending on the engineering requirements. Also, the invention is applicable to a wide range of pipe sizes and SDR's, the examples quoted are given purely as examples.

In the completed joint, the flow of molten pipe material during the making of the butt fused welded joint ensures that there is a layer 60, which is free from reinforcement fibres, which is at approximately the same thickness as the thickness of the original inner tube 30. Consequently aggressive chemicals or fluids flowing in the pipe, which may be under a pressure of, for example, 25 bar are kept away from the highly stressed fibre reinforcement. However, as there are fibres in the outer part of the butt joint, the weld interface will be weakened, resulting in the risk of brittle fracture from axial or bending loads on the pipe.

Nevertheless, the butt joint effected by the invention is very useful where such loads are kept within limits.

However, in the preferred form of joint, an electrofusion coupler 14 is fusion welded over the butt welded joint, which strengthens the joint substantially. The coupler 14 stops the butt joint from breaking in service and also protects the fibres protruding to or close to the external surface of the debeaded butt joint from the external environment. If access to the fibres was permitted, pressurised gases and liquids would permeate considerable distances along the fibres by capillary action. High pressure gas within the fibres could lead to disbanding along the reinforced layer. This could result in bursting the outer layer off the pipe or, in the event of pipeline depressurisation, collapse of the inner pipe 30.

Figure 6:
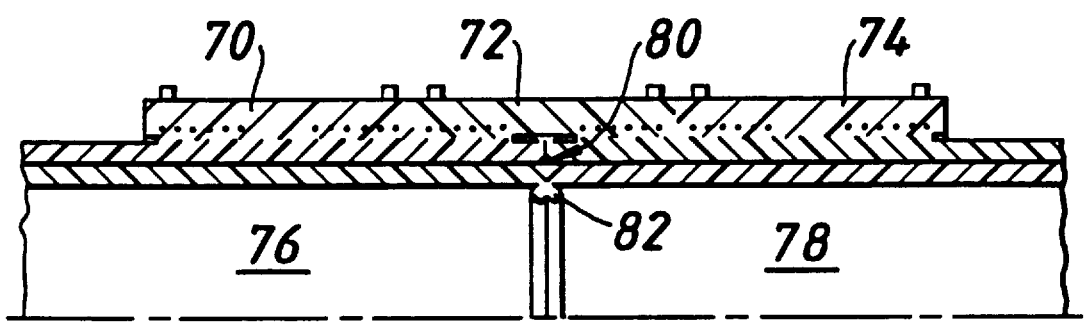
FIG. 6 shows a second embodiment.

In the examples quoted above, tests proved that the pipe burst at 125 bar without visible damage to the joint. Normally, a non-reinforced polyethylene pipe with either a butt joint and/or an electrofusion joint would burst the pipe at about 30 bar FIG. 6 shows a further embodiment. In this embodiment, three electrofusion couplers 70, 72, 74 are joined together end-to-end by butt-welds. The assembly of three couplers is then slid over one of the two pipes 76, 78 which are to be joined. The two pipes 76, 78 are butt-welded as before, the joint being shown at 80 and the external bead is removed, leaving the internal bead shown at 82.

The assembly of three couplers was then slid over the joint 80, with the middle coupler 72 straddling the joint 80.

The coupler 72 was joined to each pipe 76, 78 by an electrofusion welded joint, as before. Then, each of the two outer couplers 70, 74 was joined to the respective pipe 76 or 78 by electrofusion welded joints, as shown in FIG. 6.

Higher burst pressures are sustained by the FIG. 6 embodiment than the embodiment of FIGS. 1 to 5.

I claim:

1. A method of joining two reinforced thermoplastic pipes by a butt fused welded joint, comprising the steps of:

determining that each pipe has an inside surface, an outside surface, a pipe wall extending between the inside and the outside surface, and one or more layers of reinforcement fibres lying within an outer half of the pipe wall and extending to end portions of the pipes to be butt fused, heating the end portions of the pipe by forcing the end portions against a heater plate interposed between the end portions so that thermoplastic material from the end portions of the pipes becomes molten, removing the heater plate, forcing of the end surfaces together so that molten material from the end portions is upset involving inward and outward flow of thermoplastic material to form internal and external beads, and so that the or each reinforcement layer is wholly or primarily displaced outwardly by said outward flow during upsetting from an original position so that, at the welded joint, there is a layer of thermoplastic material between the layer or layers of reinforcement fibres and the common inside surface is free from reinforcement fibres, and allowing the pipes to cool.

2. A method according to claim 1 further including, after the butt fused welded joint has been formed, the steps of positioning an electrofusion coupler over the joint and energizing the coupler for a sufficient time to cause the coupler to become joined to the two pipes by electrofusion welded joints.

3. A method according to claim 2 and further including the step of removing the external bead before the coupler is positioned over the butt fused welded joint.

4. A method according to claim 2, wherein the coupler is provided with a radial clearance between the coupler and the outside surface of the pipes so that the external bead is small enough to be accommodated with the radial clearance.

5. A method according to claim 2 in which said electrofusion coupler is an intermediate one of three electrofusion couplers joined together end-to-end, the outermost couplers being joined respectively by electrofusion welded joints to said pipes.

6. A method according to claim 5 in which said electrofusion couplers are joined together by butt welded joints.

7. A method according to claim 5 in which said intermediate electrofusion coupler is joined first of all by electrofusion joints to said pipes after which said outermost couplers are joined by electrofusion welded joints to said pipes.

* * * * *